US011467952B2

(12) United States Patent
Pande et al.

(10) Patent No.: US 11,467,952 B2
(45) Date of Patent: *Oct. 11, 2022

(54) API DRIVEN CONTINUOUS TESTING SYSTEMS FOR TESTING DISPARATE SOFTWARE

(71) Applicant: Capital One Services, LLC, McLean, VA (US)

(72) Inventors: Govind Pande, Chantilly, VA (US); Pritam Sarkar, Richmond, VA (US); Agnibrata Nayak, Henrico, VA (US); Theodore Kayes, Henrico, VA (US); Sunil Palla, Henrico, VA (US); Mark Mikkelson, Richmond, VA (US); Pradosh Sivadoss, Broadlands, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/238,850

(22) Filed: Apr. 23, 2021

(65) Prior Publication Data
US 2021/0240604 A1 Aug. 5, 2021

Related U.S. Application Data

(63) Continuation of application No. 16/683,525, filed on Nov. 14, 2019, now Pat. No. 11,023,369, which is a
(Continued)

(51) Int. Cl.
*G06F 11/36* (2006.01)
*G06F 16/28* (2019.01)

(52) U.S. Cl.
CPC ...... *G06F 11/3692* (2013.01); *G06F 11/3664* (2013.01); *G06F 11/3688* (2013.01); *G06F 16/284* (2019.01)

(58) Field of Classification Search
None
See application file for complete search history.

(56) References Cited

U.S. PATENT DOCUMENTS 9,021,448 B1* 4/2015 Gagliardi ............ G06F 11/3636
717/133
9,183,123 B2* 11/2015 Spektor ............... G06F 11/3684
(Continued)

FOREIGN PATENT DOCUMENTS

CN 108334437 7/2018
CN 108874650 11/2018
(Continued)

OTHER PUBLICATIONS

Kristen Aebersold, "Continuous Integration vs. Continuous Delivery," SmartBear, https://smartbear.com/learn/automated-testing/the-continuous-development-pipeline/ (accessed Mar. 29, 2019).

*Primary Examiner* — Anna C Deng
(74) *Attorney, Agent, or Firm* — Troutman Pepper Hamilton Sanders LLP; Christopher J. Forstner; John A. Morrissett

(57) ABSTRACT

A system for providing an API-driven continuous test platform is disclosed. The system may include one or more processors, a test engine, one or more test agents, and a database. The system may prepare (according to a configuration file) a first test configuration comprising a first selection of the one or more test agents, execute (using the test engine) the first test configuration to produce one or more first test results, and store (using the database) the one or more first test results. Finally, the system may process (using a continuous integration and continuous delivery (CI/CD) pipeline) the first test results by performing at least one of the following CI/CD processes: updating a central code base of an enterprise production environment, rejecting at least
(Continued)

one code snippet processed by the test engine during execution of the first test configuration, and marking the first test results as inconclusive.

19 Claims, 9 Drawing Sheets

Related U.S. Application Data continuation of application No. 16/443,274, filed on Jun. 17, 2019, now Pat. No. 10,534,701.

(56) References Cited

U.S. PATENT DOCUMENTS

| | | | |
|---|---|---|---|
| 9,978,084 B1* | 5/2018 | Sharma | G06F 17/16 |
| 10,216,509 B2 | 2/2019 | Vincente et al. | |
| 2009/0271768 A1* | 10/2009 | Goodson | G06F 11/3624 |
| | | | 717/125 |
| 2013/0080999 A1* | 3/2013 | Yang | G06F 11/3664 |
| | | | 717/124 |
| 2014/0019498 A1* | 1/2014 | Cidon | G06F 16/182 |
| | | | 707/827 |
| 2014/0380281 A1* | 12/2014 | McLaughlin | G06F 11/3688 |
| | | | 717/127 |
| 2018/0165122 A1* | 6/2018 | Dobrev | G06F 8/38 |
| 2019/0042400 A1* | 2/2019 | Surace | H04L 67/146 |
| 2019/0065352 A1* | 2/2019 | Patel | G06F 11/3664 |

FOREIGN PATENT DOCUMENTS

| | | |
|---|---|---|
| CN | 109344080 | 2/2019 |
| WO | 2018231510 | 12/2018 |

* cited by examiner

API DRIVEN CONTINUOUS TESTING SYSTEMS FOR TESTING DISPARATE SOFTWARE

CROSS REFERENCE TO RELATED APPLICATIONS

This application is a continuation of, and claims priority under 35 U.S.C. § 120 to, U.S. patent application Ser. No. 16/683,525, filed Nov. 14, 2019, which is a continuation of U.S. patent application Ser. No. 16/443,274, now U.S. Pat. No. 10,534,701, filed Jun. 17, 2019, the entire contents of each of which are fully incorporated herein by reference.

SUMMARY

The present disclosure relates generally to systems for testing software on an enterprise network, and more specifically to systems implementing an API driven, modular, continuous testing framework for testing disparate software that produces uniform reports on the enterprise network.

BACKGROUND

Typically, automation and networking engineers have to use multiple test frameworks for different types of tests and for different application architectures. The interfaces are different for these different frameworks, and the test frameworks generate test reports in different formats and in different user interfaces. These disparate test reports often have to be stored, for example, in repositories for audit purposes, and differences in the report formats may make it difficult to aggregate and efficiently store the reports and perform trend analysis or a detailed investigation of system tendencies in response to various application behaviors. Further, when operating in a Continuous Integration, Continuous Delivery, and Continuous Testing (CI/CD/CT) pipeline, the test results and reports must be manually converted and entered according to a compatible (CI/CD/CT) format, requiring additional time and expense to convert while making the systems susceptible to data inaccuracies and inconsistencies. As a result, it is often difficult to integrate multiple automated testing frameworks into a single CI/CD/CT pipeline.

Accordingly, there is a need for improved devices, systems, and methods that can consolidate testing from among several different applications, frameworks and architectures onto a single platform for reporting results in a uniform format. The disclosed systems and methods are directed to these and other considerations.

SUMMARY

Disclosed embodiments provide technology for an API driven continuous testing platform extensible for all types of testing and for all types of software applications. To accomplish this, in some embodiments, a test platform is provided with a test engine and a collection of test agents that inspect one or more assorted software applications adhering to different test frameworks. As a consequence, administrators need only deploy one single testing platform for all types of software applications and all types of testing for use by one or more developers.

Consistent with the disclosed embodiments, the disclosed technology may include a system for providing an API-driven continuous test platform. In some embodiments, the system may include one or more processors, a test engine, one or more test agents, a database for storing the one or more test agents, and memory storing instructions that, when executed by the one or more processors, are configured to cause the system to perform various functions. For example, the system may prepare, according to a configuration file (e.g., a JSON Java test file, or a formatted file listing all testSets), a first test configuration including a first selection of the one or more test agents (e.g., functional test agents or performance test agents). Further, in one or more embodiments, the system may execute, using the test engine, the first test configuration to produce one or more first test results, and store the one or more first test results using the database (e.g., a cloud-based database, a relational database service (RDS), an Amazon Web Services (AWS) database, or a combination of databases). In various embodiments, the system may process, using a continuous integration and continuous delivery (CI/CD) pipeline (e.g., COVE, Jenkins, RevUP, Bogie, Hyperloop), the first test results by performing at least one CI/CD process of various CI/CD processes based on the first test results. In one or more embodiments, the various CI/CD processes may include one or more of: updating a central code base of an enterprise production environment (e.g., a corporate network, educational network, data center network, government network, military network, or backbone network), rejecting at least one code snippet processed by the test engine during execution of the first test configuration (e.g., by deletion, quarantine, sandboxing, or black-holing), and marking the first test results as inconclusive.

In another aspect, the disclosed technology may also include a system having one or more processors, a test platform, a production environment executing a central code base (e.g., a corporate network, educational network, data center network, government network, military network, or backbone network), and memory storing instructions that, when executed by the one or more processors, are configured to cause the system to perform various functions. For example, the system may prepare, according to a configuration file (e.g., a JSON Java test file, or a formatted file listing all testSets), a first test configuration for testing a code snippet, the first test configuration optionally including a first selection of one or more test frameworks (e.g., RestAssured, Karate, RubyCucumber, Postman, Mocha, Protractor, Selenium, JMeter, WRK, Hercules, Behave, Puppeteer) on the test platform. In various embodiments the system may execute, using a test engine on the test platform, the first test configuration to produce one or more first test results. Additionally, the system may automatically incorporate, using a CI/CD pipeline (e.g., COVE, Jenkins, RevUP, Bogie, Hyperloop), the first test results into the production environment by updating (e.g., by recompiling, replacing, side-loading, formatting, or re-writing) the central code base to incorporate the code snippet.

In yet another aspect, the disclosed technology may also include a system having one or more processors, a CI/CD agent, a CI/CD protocol (e.g., COVE, Jenkins, RevUP, Bogie, Hyperloop), and memory storing instructions that, when executed by the one or more processors, are configured to cause the system to perform various functions. For example, the system may launch, by the CI/CD agent and in accordance with the CI/CD protocol, a test engine and one or more test agents (e.g., functional test agents or performance test agents). In various embodiments, the system may prepare, according to a first test configuration, a first selection of one or more test agents including one or more test frameworks (e.g. RestAssured, Karate, RubyCucumber, Postman, Mocha, Protractor, Selenium, JMeter, WRK, Hercules, Behave, Puppeteer). In one or more embodiments, the system may process, by the test engine and in concert with the first selection of one or more test agents, the first test configuration to produce one or more first test results. Further, the system may generate, using the CI/CD agent and according to the one or more first test results, a second test configuration (e.g., based on a JSON Java test file, or a formatted file listing all testSets).

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
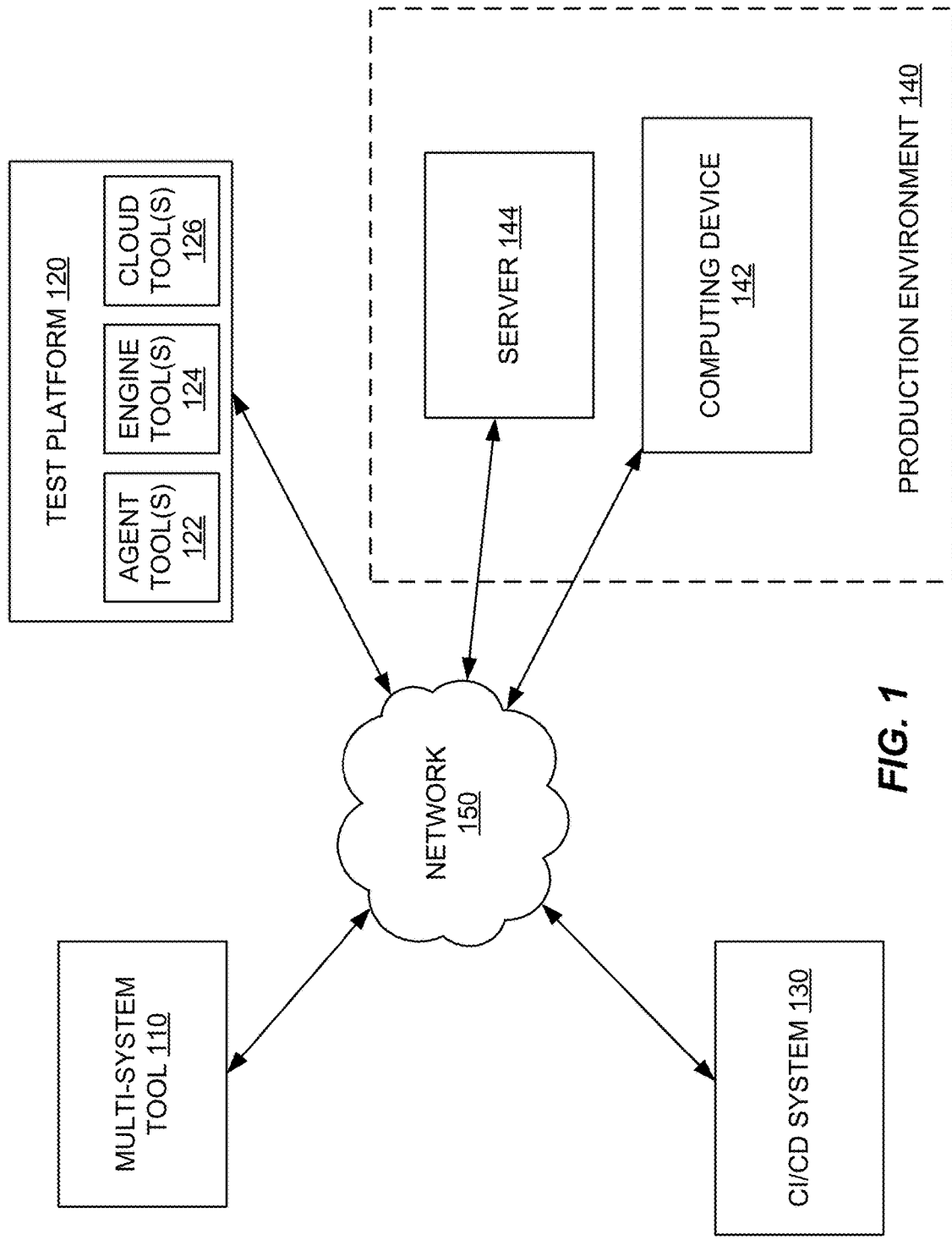
FIG. 1 is a system diagram of an example system for providing an API-driven continuous test platform, according to one or more embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

According to one aspect of the disclosed technology, a system for providing an API-driven continuous test platform is disclosed. The system may have one or more processors, a test engine, one or more test agents, a database for storing the one or more test agents, and memory storing instructions that, when executed by the one or more processors, are configured to cause the system to perform various functions. For example, the system may prepare, according to a configuration file, a first test configuration comprising a first selection of the one or more test agents. Further, the system may execute, using the test engine, the first test configuration to produce one or more first test results, and store, using the database, the one or more first test results. In various embodiments, the system may process, using a continuous integration and continuous delivery (CI/CD) pipeline, the first test results by performing at least one CI/CD process of several CI/CD processes based on the first test results. In one or more embodiments the CI/CD processes may include: updating a central code base of an enterprise production environment, rejecting at least one code snippet processed by the test engine during execution of the first test configuration, and marking the first test results as inconclusive.

In some embodiments, the one or more test agents may include one or more test frameworks of the following test frameworks: Karate, Protractor, RestAssured, RubyCucumber, and Apache JMeter. In various embodiments, the one or more test frameworks may include modular test frameworks that each correspond to one or more given applications. Further, in some embodiments, the system may include one or more of adding and removing at least one of the one or more modular test frameworks in response to a change in the one or more given applications. Additionally, in some embodiments, the database may include a postgres relational database. According to one or more embodiments, a dockerizing module may be configured to control the allocation of the one or more test agents based on a level of demand on the test engine.

According to another aspect of the disclosed technology, a system may have one or more processors, a test platform, a production environment executing a central code base, and memory storing instructions that, when executed by the one or more processors, are configured to cause the system to perform various functions. For example, in one or more embodiments, the system may prepare, according to a configuration file, a first test configuration for testing a code snippet, the first test configuration optionally including a first selection of one or more test frameworks on the test platform. Further, in some embodiments, the system may execute, using a test engine on the test platform, the first test configuration to produce one or more first test results. According to some embodiments, the system may automatically incorporate, using a CI/CD pipeline, the first test results into the production environment by updating the central code base to incorporate the code snippet.

In some embodiments, the system may include a verification control module configured to order a batch execution of a desired set of the one or more test frameworks to produce one or more batch sets of test results. In various embodiments, the batch execution optionally includes at least one execution of: sequential execution of the desired set of the one or more test frameworks to produce the one or more batch sets of test results, and parallel execution of the desired set of the one or more test frameworks to produce the one or more batch sets of test results. In one or more embodiments, the system includes a dockerizing module configured to scale resources assigned to the test engine according to a demand level of the batch execution. Further, in some embodiments, the automatically incorporating, using the CI/CD pipeline, the first test results into the production environment by updating the central code base to incorporate the code snippet optionally includes re-compiling a source code for the central code base along with the code snippet. Further, in one or more embodiments, the one or more test frameworks may include modular test frameworks that each correspond to one or more given applications. According to some embodiments, the memory stores further instructions that, when executed by the one or more processors, are configured to optionally cause the system to one or more of add and remove at least a first modular test framework of the one or more modular test frameworks in response to a change in the one or more given applications. Further, in some embodiments, the automatically incorporating, using the CI/CD pipeline, the first test results into the production environment by updating the central code base to incorporate the code snippet optionally includes re-writing a source code for the central code base along with a desired function of the code snippet. According to some embodiments, the configuration file optionally comprises a JSON java file that specifies one or more parameters of the following parameters: type of test, one or more agents to use, resource location, and a set of properties. Additionally, in various embodiments, the system may further include instructions, which when executed by the one or more processors, are optionally configured to cause the system to store, using a cloud-based relational database, the first test configuration and the one or more first test results.

According to another aspect of the disclosed technology, a system having one or more processors may be disclosed. The system may include a CI/CD agent, a CI/CD protocol, and memory storing instructions that, when executed by the one or more processors, are configured to cause the system to perform various functions. For example, in some embodiments, the system may launch, by the CI/CD agent and in accordance with the CI/CD protocol, a test engine and one or more test agents. According to some embodiments, the system may prepare, according to a first test configuration, a first selection of one or more test agents including one or more test frameworks. In one or more embodiments, the system may process, by the test engine and in concert with the first selection of one or more test agents, the first test configuration to produce one or more first test results. According to some embodiments, the system may generate, using the CI/CD agent and according to the one or more first test results, a second test configuration.

In some embodiments, each of the one or more test frameworks may encapsulate one or more functional or performance tools, and each of the one or more functional or performance tools may output tool results that are non-uniform with one another. Further, in some embodiments, the one or more first test results produced by the test engine include a plurality of first test results, and each of the plurality of first test results are uniform with one another irrespective of which of the one or more test frameworks are comprised by the one or more test agents. In various embodiments, the system may perform a trend analysis using the plurality of first test results. In some embodiments, the one or more test agents comprise modular test agents that each correspond to one or more given applications. In further embodiments, the system may perform one or more of adding and removing at least one of the one or more modular test agents in response to a change in the one or more given applications. In some embodiments the test configuration includes a JSON java test configuration. In various embodiments, the instructions, when executed by the one or more processors, are optionally configured to cause the system to process, by the test engine and in concert with a second selection of one or more test agents, the second test configuration to produce one or more second test results.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 shows an exemplary system 100 for implementing an API testing platform according to one or more embodiments disclosed herein. In one embodiment, API(s) are published and documented using a Swagger UI, which is an open source project to visually render documentation for an API defined with an OpenAPI. As shown, system 100 may include one or more of a multi-system tool 110, a test platform 120 (which may include one or more agent tools 122, one or more engine tools 124, and/or one or more cloud tools 126), a CI/CD system 130, a production environment 140 (which may include one or more servers 144, and one or more computing devices 142), and a network 150. In one or more embodiments, the production environment 140 may comprise a system-under-test. The multi-system tool 110 may function as an interface for users, developers, or other interested parties to submit requests, access results, perform trend analysis, and/or submit or withdraw test result decisions from a CI/CD pipeline (e.g., I/CD System 130). In various embodiments, trend analysis may include a comparison of test results using specific standard test reports generated by the test platform, which may indicate how well test executions performed in the past. Test platform 120 may receive and process requests to execute test configurations, which may include summoning one or more test agents, test frameworks, storage databases, and/or test engines. CI/CD system 130 may include actual code, scripts, and processes for running a CI/CD pipeline, which may entail incorporating test results (e.g., code snippets, compiled or re-compiled code and/or application bases, engineering decisions based on trend analysis, etc.) into production environment 140. In one embodiment, CI/CD system 130 may simply provide a source for downloading or otherwise providing the necessary tools to operate a CI/CD pipeline in another location (e.g., in production environment 140). In another embodiment, production environment 140 may include a full-scale corporate or enterprise network with all necessary backend devices, server management, electrical and optical network switching, user and endpoint devices, service management logic, and application logic. Production environment 140 may include the CI/CD pipeline.

Figure 2:
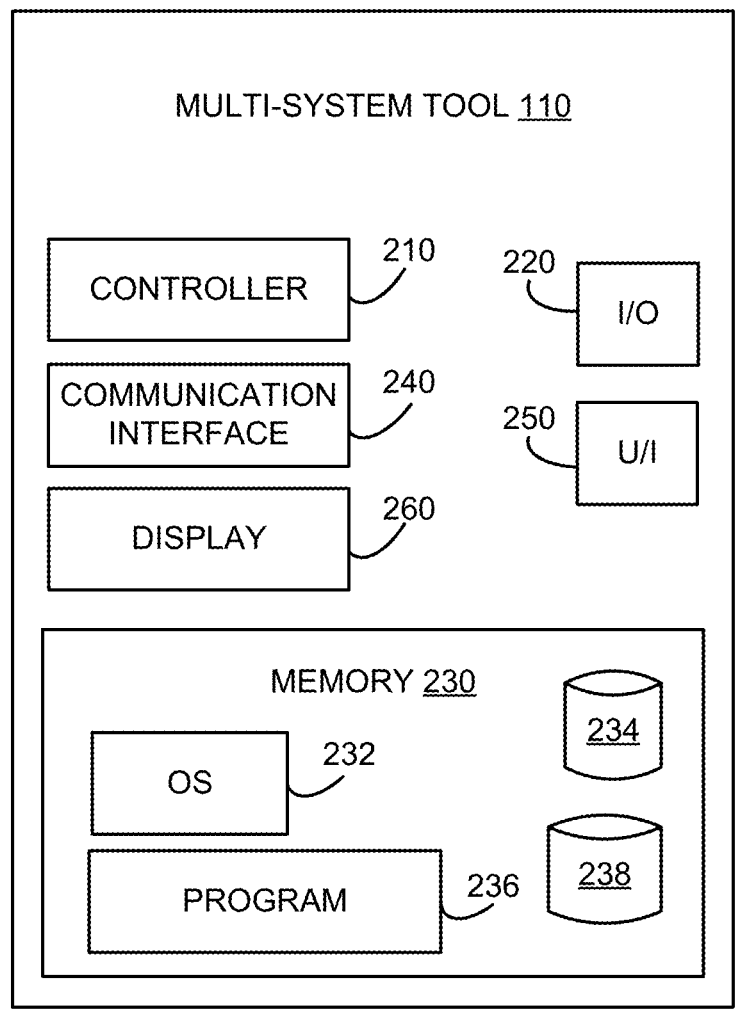
FIG. 2 is a component diagram of an example multi-system tool, in accordance with some embodiments.

Multi-system tool 110 generally encompasses any tool for coordinating and interfacing with various components of system 100, for example, during test configuration, execution, storage or analysis. In one embodiment, multi-system tool 110 operates using the Swagger UI. As shown in more detail in FIG. 2, multi-system tool 110 may include a controller 210 (e.g., one or more processors), an input/output (I/O) device 220, a memory 230, which may contain an operating system (OS) 232, one or more storage devices 234, which may be any suitable repository of data and which may include memory module 238, a program 236, and a communication interface 240. In certain embodiments, multi-system tool 110 may include a user interface (U/I) device 250 for receiving user input data, such as data representative of a click, a scroll, a tap, a press, or typing on an input device that can detect tactile inputs. In some embodiments, multi-system tool 110 can additionally include a display 260.

In some embodiments, multi-system tool 110 may include a peripheral interface (not shown), which may include the hardware, firmware, and/or software that enables communication with various peripheral devices, such as media drives (e.g., magnetic disk, solid state, or optical disk drives), other processing devices, or any other input source used in connection with the instant techniques. In some embodiments, the peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, communication interface 240 may include a transceiver (not shown). The transceiver may be configured to communicate with compatible devices and ID tags when they are within a predetermined range. The transceiver may be compatible with one or more of: radio-frequency identification (RFID), near-field communication (NFC), Bluetooth™ Bluetooth™ low-energy (BLE) (e.g., BLE mesh and/or thread), Wi-Fi™, ZigBee™, ambient backscatter communications (ABC) protocols or similar technologies.

In some embodiments, multi-system tool 110 may include a mobile network interface (not shown), which may provide access to a cellular network, the Internet, or another wide-area network. In some embodiments, the mobile network interface may include hardware, firmware, and/or software that allows controller 210 to communicate with other devices via wired or wireless networks, whether local or wide area, private or public. Multi-system tool 110 may also include a power source configured to provide an appropriate alternating current (AC) or direct current (DC) to power one or more components of multi-system tool 110.

Controller 210 may include one or more of an application specific integrated circuit (ASIC), programmable logic device, microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 232, application programs 236 (including, for example, a web browser application, a widget or gadget engine, and or other applications, as necessary), executable instructions and data. In some embodiments, controller 210 may include a secure microcontroller, which may be configured to transmit and/or facilitate secure lines of communication. In some embodiments, some or all of the processing techniques described herein can be implemented as a combination of executable instructions and data within memory 230.

Controller 210 may be one or more known processing devices, such as a microprocessor from the Pentium™ family manufactured by Intel™, the Turion™ family manufactured by AMD™, or the Cortex™ family or SecurCore™ manufactured by ARM™. Controller 210 may constitute a single-core or multiple-core processor that executes parallel processes simultaneously. For example, controller 210 may be a single core processor that is configured with virtual processing technologies. In certain embodiments, controller 210 may use logical processors to simultaneously execute and control multiple processes. Controller 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Storage device(s) 234 may be configured to store information used by controller 210 (or other components) to perform certain functions related to the disclosed embodiments. As an example, multi-system tool 110 may include memory 230 that includes instructions to enable controller 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, multi-system tool 110 may include memory 230 that includes instructions that, when executed by controller 210, perform one or more processes consistent with the functionalities disclosed herein. Methods, systems, and articles of manufacture consistent with disclosed embodiments are not limited to separate programs or computers configured to perform dedicated tasks.

Memory 230 may include one or more memory devices that store data and instructions used to perform one or more features of the disclosed embodiments. Memory 230 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 230 may include software components that, when executed by controller 210, perform one or more processes consistent with the disclosed embodiments. In some embodiments, memory 230 may include a memory module (MM) 238 consistent with the disclosed embodiments.

Multi-system tool 110 may also be communicatively connected to one or more memory devices (e.g., databases (not shown)) locally or through a network. The remote memory devices may be configured to store information and may be accessed and/or managed by multi-system tool 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

In example embodiments of the disclosed technology, multi-system tool 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While multi-system tool 110 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of multi-system tool 110 may include a greater or lesser number of components than those illustrated. Some embodiments may exclude certain components discussed herein.

Although the preceding description describes various functions of multi-system tool 110 and particularly controller 210, in some embodiments, some or all of these functions may be carried out by multiple computing devices. For example, in some embodiments, some or all of the functionalities of controller 210 and/or multi-system tool 110 may be carried out by a remote computing device (not shown) or another component included in multi-system tool 110 that is separate and distinct from controller 210, such as an encoder or a different processor.

Returning to FIG. 1, test platform 120 (including agent tools 122, engine tools 124, and cloud tools 126) is shown outside production environment 140, but it will be appreciated that test platform 120 may be within the production environment 140 or apart from the production environment 140 according to various embodiments, without departing from the spirit and scope of the disclosure. Test platform 120 may include any number of processors, servers, blade servers, rack-mount devices, and/or software packages according to various embodiments. In some embodiments, test platform 120 is a data center. Agent tools 122 are provided for interfacing with various software applications, and may include one or more testing frameworks (e.g., RestAssured, Karate, RubyCucumber, Postman, Mocha, Protractor, Selenium, JMeter, WRK, Hercules, Behave, Puppeteer). Engine tools 124 provide a mechanism for executing tests according to a test configuration (e.g., a JSON Java test file, or a formatted file listing all testSets), and may include a number of processors, scripts, or modules for producing reports. Cloud tools 126 may provide a storage function and may encompass digital storage space directly or provide an interface to cloud-based digital storage.

CI/CD system 130 may comprise any necessary tools for operation of a CI/CD pipeline within system 100. CI/CD system 130 may operate a CI/CD pipeline itself, or may provide one or more necessary scripts, binaries, applications, or packages for enabling operation of the CI/CD pipeline on another component (e.g., on production environment 140). For example, when CI/CD system 130 itself includes the necessary tools for operating the CI/CD pipeline, CI/CD system 130 may have one or more processors and other structural components as described with respect to multi-system tool 110 (e.g., when operating as a single-homed service) and/or one or more servers, computing devices, and other structural components as described with respect to production environment 140 (e.g., when operating as a multi-homed service).

Production environment 140 may include any network where it is desirable to perform application testing, according to various embodiments of the disclosure. For example, production environment 140 may comprise a corporate network, educational network, data center network, government network, military network, or backbone network. Production environment 140 may contain server(s) 144 and computing device(s) 142. In one embodiment, computing device(s) 142 and/or server(s) 144 may include one or more processors and other structural components as described with respect to multi-system tool 110 (e.g., when they are operating as single-homed entities). Further, server(s) 144 may include one or more enterprise-level CPUs (e.g., Xeon™ Ryzen Pro™, or custom-built architectures), blade servers, array controllers, optical networking adapters, and/or failover modules as necessary. Further, computing device(s) 142 may include one or more workstation-level hard drives, processors, Ethernet™ networking adapters, user input devices (e.g., mice, keyboards, and monitors), and/or external peripherals such as printers, plotters, and optical scanners. It may be desirable to optimize, through application testing, operation of one or more of server(s) 144, computing device(s) 142 and production environment 140. For example, in one embodiment, operation of a CI/CD pipeline via CI/CD system 130 may act at a high level to virtualize functions of production environment 140 in order to execute one or more test configurations with one or more inputs (e.g., applications, code snippets, or code bases) and output results therefrom for users and/or administrator that accurately and effectively convey how those inputs would perform when permanently or physically executed in production environment 140. For example, CI/CD system 130 may use one or more virtual servers, virtual machines, and/or hardware abstraction layers to mimic functions of production environment 140 in order to execute test configurations without occupying or otherwise interrupting production environment 140, since production environment 140 is the resource that system 100 is attempting to optimize. In various embodiments, rather than virtualizing functions of production environment 140, operation of a CI/CD pipeline via CI/CD system 130 may directly employ functions of production environment 140 in a non-virtualized way in order to execute one or more test configurations with one or more inputs (e.g., applications, code snippets, or code bases) and output results therefrom for users and/or administrator that accurately and effectively convey how those inputs actually perform when physically executed in production environment 140. For example, CI/CD system 130 may use one or more servers 144, computing devices 142, or other elements of production environment 140 to execute test configurations on the resource that system 100 is attempting to optimize, which may provide the most realistic results. In other words, CI/CD pipeline, via CI/CD system 130, may provide a fully-featured service for testing various configurations, instantiating one or more configurations, and/or rolling back the configurations (e.g., IA reverting, failsafing, sandboxing, and/or recompiling).

Facilitating communication between components of the system 100, network 150 may be of any suitable type, including individual connections via the Internet such as cellular or WiFi networks. In some embodiments, network 150 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 150 may comprise any type of computer networking arrangement used to exchange data. For example, a network may be the Internet, a private data network, virtual private network using a public network, and/or other suitable connection(s) that enables components in system 100 to send and receive information between the components of system 100 or to and from computing devices that are external to the system 100. Network 150 may also include a public switched telephone network ("PSTN") and/or a wireless network.

Figure 3:
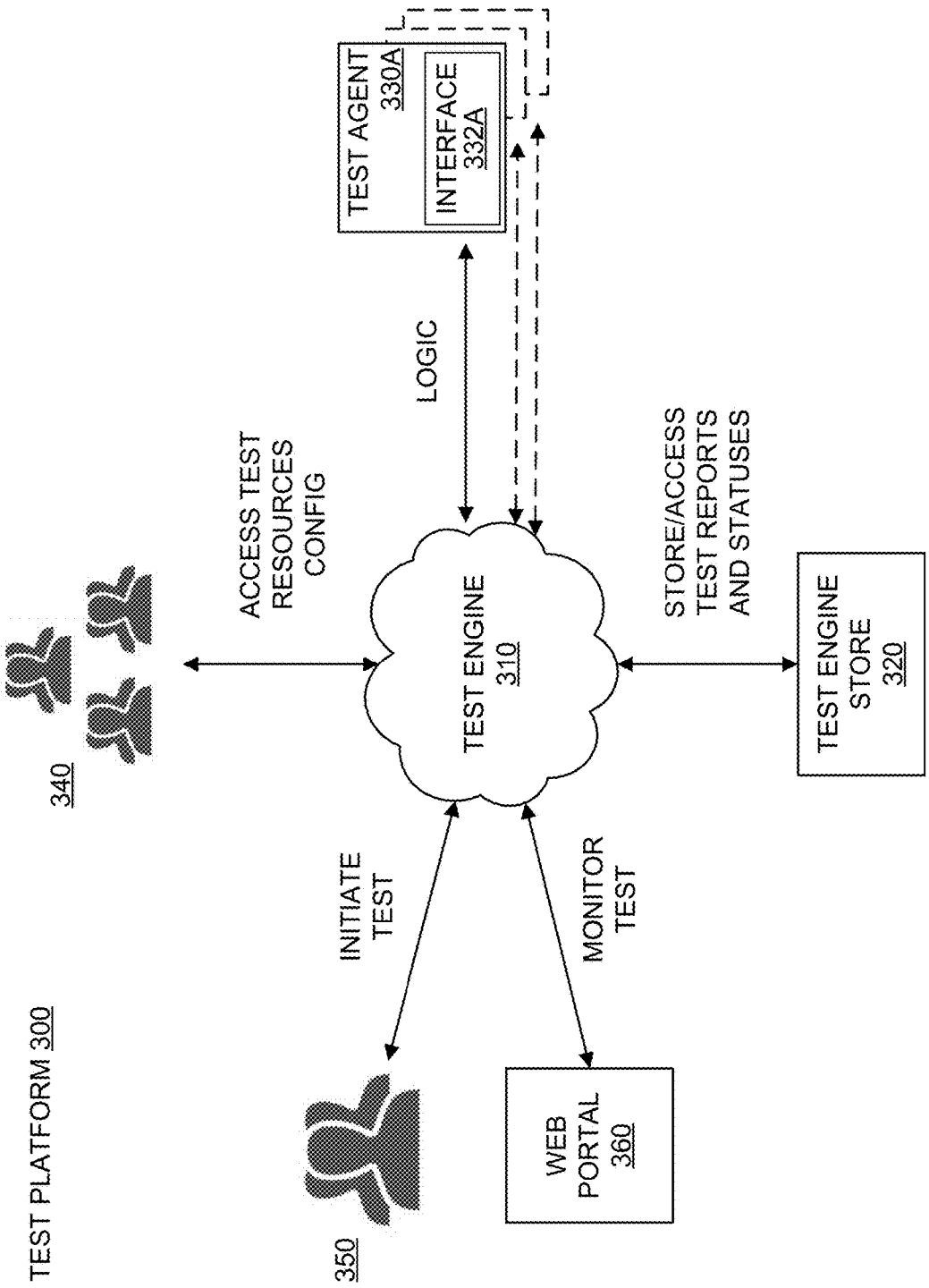
FIG. 3 is a representation of an example test platform, in accordance with some embodiments.

FIG. 3 shows one example of test platform 300 according to various embodiments. For example, test platform 300 may operate in accordance with one or more features and functions of test platform 120 described in FIG. 1. In one embodiment, test platform 300 contains any necessary test agent(s), test framework(s), test engine(s), and/or test configuration(s) necessary to effectuate results for user(s) and/or administrator(s) based on input(s) received therefrom. Test engine 310 may provide a mechanism for executing tests according to a test configuration (e.g., a JSON Java test file, or a formatted file listing all testSets), and may include any number of processors, scripts, or modules for producing reports. Upon execution of a test configuration, test engine 310 may store the results in test engine store 320. Further, test engine store 320 may provide a storage function and encompass digital storage space directly or provide an interface to cloud-based digital storage (e.g., cloud tools 126, memory 230, storage device 234, memory module 238, a cloud-based database, a relational database service (RDS), an Amazon Web Services (AWS) database, or a combination of databases). The contents of test engine store 320 may be accessed to perform trend analysis or a detailed investigation of system tendencies in response to various application behaviors. In one embodiment, results in test engine store 320 may be saved in a uniform format for integration with a CI/CD pipeline (e.g., CI/CD system 130). The CI/CD pipeline may adhere to one or more various protocols (e.g., COVE, Jenkins, RevUP, Bogie, Hyperloop). Cooperating with test engine 310 are one or more test agents 330A, each with one or more interfaces 332A. Test agents 330A may provide one or more test frameworks (e.g., RestAssured, Karate, RubyCucumber, Postman, Mocha, Protractor, Selenium, JMeter, WRK, Hercules, Behave, Puppeteer). Each test framework may be customized for a specific application, and the framework may parse non-uniform output from the specific application in order to provide one or more uniform reports for storage in test engine store 320. Sample reports for performance and functional tests appear for exemplary purposes in the disclosure below. It would be appreciated that various uniform report formats may be contemplated without departing from the spirit and scope of this disclosure. In one embodiment, each test agent has logic that enables the test agent to parse the test framework native test report (e.g., cucumber, junit, jasmine, or mocha test reports). In various embodiments, each test agent has logic such that it is configured to handle the native test report generated by the test framework. With this logic, a test agent may look for certain aspects such as, for example, scenarios in a cucumber test report to decide a test case name. It may then aggregate all of the test case names and their respective statuses to form a uniform (e.g., standardized in one or more of format, units, symbols, abbreviations, etc.) test report. A web portal 360 is provided for executing and monitoring tests by one or more administrators 350 and/or users 340. Web portal 360 may operate using a Swagger UI.

Figure 4:
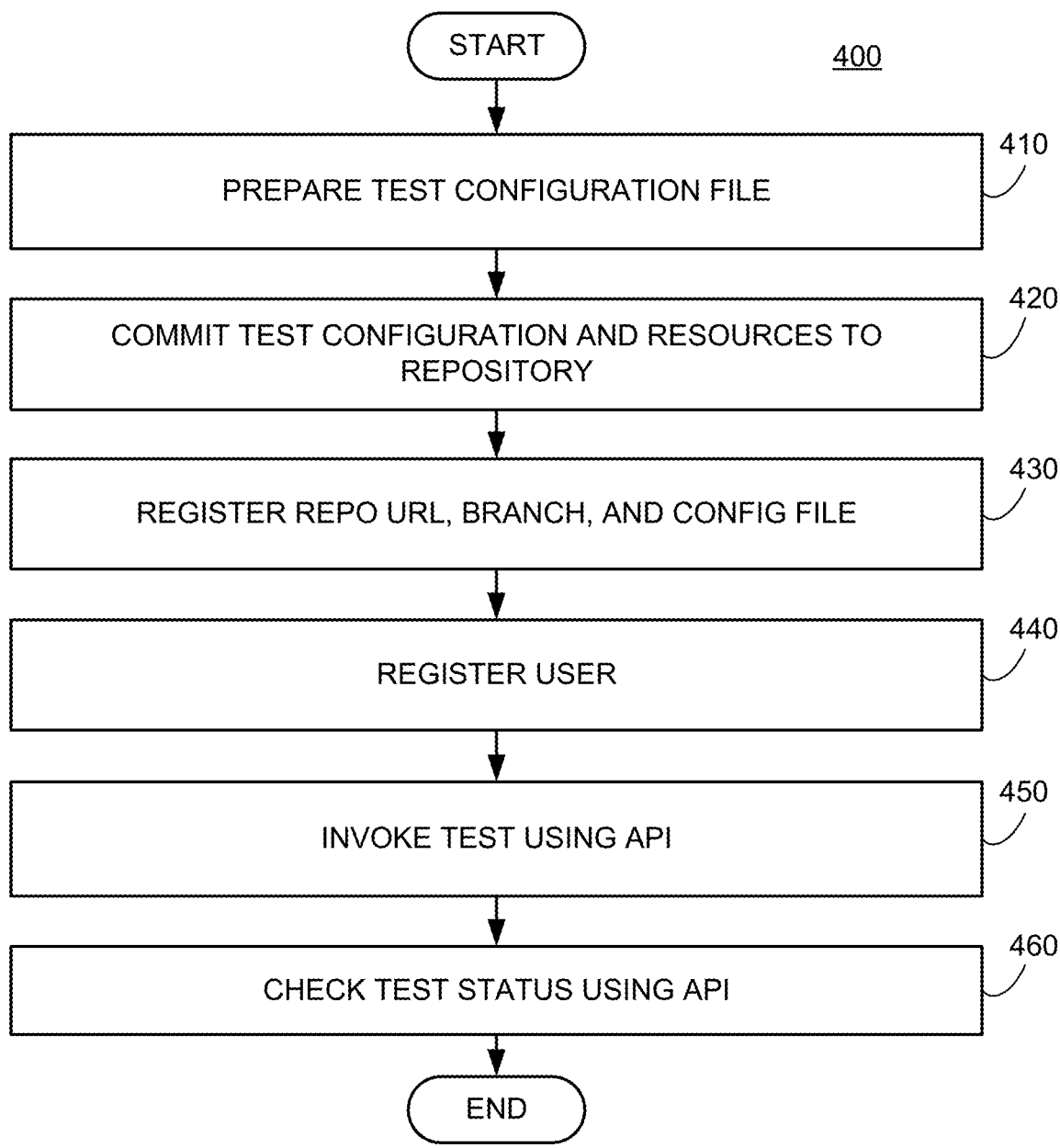
FIG. 4 is a flowchart showing operation of a first example system including an enterprise test platform, in accordance with some embodiments.

FIG. 4 shows a flowchart of a method 400 according to an example embodiment. Method 400 may be performed by controller 210 and/or other components of multi-system tool 110 alone or in cooperation with one or more other devices or systems within system 100. In block 410, the method (e.g., via multi-system tool 110 of system 100) may include preparing a test configuration file. The test configuration file may be a JSON Java test file or any formatted file listing all testSets desired to be executed. A testSet may have a unique name and specify a type of test, collection of one or more test agents to use, resource locations, and a set of properties. In some embodiments, the test configuration file may be prepared at the direction of one or more user(s) 340 and/or administrator(s) 350 and may generally represent an overall test configuration that a preparer of the test wishes to analyze in order to optimize production environment 140. The test configuration may be designed and submitted via one or more of web portal 360, multi-system tool 110, CI/CD system 130, test platform 120, and/or production environment 140.

In block 420, the system (e.g., via multi-system tool 110 of system 100) may commit the test configuration and resources to a repository (e.g., storage device 234, memory module 238, cloud tool(s) 126, and/or memory 230). For example, the test configuration may be committed to a GitHub repository, which is later accessed by one or more test engines (e.g., test engine 310) to execute the configuration when they are available. The repository may be a public repository or private repository. Further, storage device 234, memory module 238, cloud tool(s) 126, and/or memory 230 may store one or more committed test configurations for immediate or future execution (e.g., at the direction of a load-balancer or resource director). Further, in some embodiments, execution of the test configuration may be carried out in a sequential or parallel manner, as will be discussed below.

In block 430, the system (e.g., via multi-system tool 110 of system 100) may register a repository URL, branch, and the test configuration file. For example, the repository URL may point to a location of the committed test configuration for access by a test engine (e.g., test engine 310), and the branch refers to a specific version of the test when multiple versions are present. In one embodiment a new branch is created whenever a test is modified. In various embodiments, registering the repository URL, branch, and/or test configuration file may include notifying one or more of CI/CD system 130, multi-system tool 110, test platform 120, and/or production environment 140 regarding the whereabouts of the test components (e.g., in storage device 234, memory module 238, cloud tool(s) 126, and/or memory 230) and the readiness of test components for processing and/or execution.

In block 440, the system (e.g., via multi-system tool 110, and/or web portal 360) may register a registered user. For example, via web portal 360, one or more administrators 350 or users 340 may create or log into a test account, which becomes associated with the test configuration for execution and report access. In one embodiment, registered users as described hereinabove may include one or more user(s) 340, administrator(s) 350, developer(s), and/or other interested parties who wish to optimize operations of production environment 140.

In block 450, the system (e.g., via multi-system tool 110, and/or web portal 360) may invoke the test using one or more application programming interfaces (APIs). For example, the registered user may execute the test via Swagger UI. In some embodiments, the API(s) may provide a layer of abstraction and/or control between requester(s) of tests (e.g., user(s) 340, administrator(s) 350, and/or developer(s)) and executor(s) of tests (e.g., multi-system tool 110, test platform 120, CI/CD system 130, and/or production environment 140). In one or more embodiments, the API may provide one or more sets of programming interfaces that interact between requestor(s) of tests and executor(s) of tests. For example, a set of programming interfaces of the API may carry inputs received from a test configuration file (e.g., a JSON file or JAVA file) from a requestor(s) and convert those to inputs for execution by executor(s) (e.g., inputs such as one or more sets of test agent(s) 330A, test engine(s) 310, and/or test framework(s)). In one embodiment, API(s) are published and documented using a Swagger UI, which is an open source project to visually render documentation for an API defined with an OpenAPI. However, it will be appreciated that API(s) may be acquired in any manner without departing from the spirit and scope of this disclosure. In various embodiments, API(s) may be specific to each application that is being tested, and may provide a unique set of rules for processing input(s) and/or output(s) for each application. In some embodiments, API(s) may be the same or similar among one or more applications that are being tested. In some embodiments, by invoking the test in block 450, as discussed above, CI/CD system 130 may use one or more virtual servers, virtual machines, and/or hardware abstraction layers to mimic functions of production environment 140 in order to execute the test configuration, using API(s) inputs rules, without occupying or otherwise interrupting production environment 140. In other embodiments by, invoking the test in block 450, as discussed above, operation of a CI/CD pipeline via CI/CD system 130 may directly employ functions of production environment 140, using API(s) inputs rules, in order to execute the test configuration. For example, CI/CD system 130 may use one or more servers 144, computing devices 142, or other elements of production environment 140 to execute the test configuration.

In block 460, the system (e.g., via multi-system tool 110, and/or web portal 360) may check test status using the API(s). For example, the registered user may access the test results via Swagger UI. In some embodiments, the Swagger UI may provide a public Internet or corporate intranet interface for logging-in to view test results or for specifying one or more methods for reception of test results (e.g., email, text, PDF download, or GitHub link). In various embodiments, checking test status in block 460 may include one or more CI/CD processing steps or other processing steps, as will be discussed below.

Figure 5:
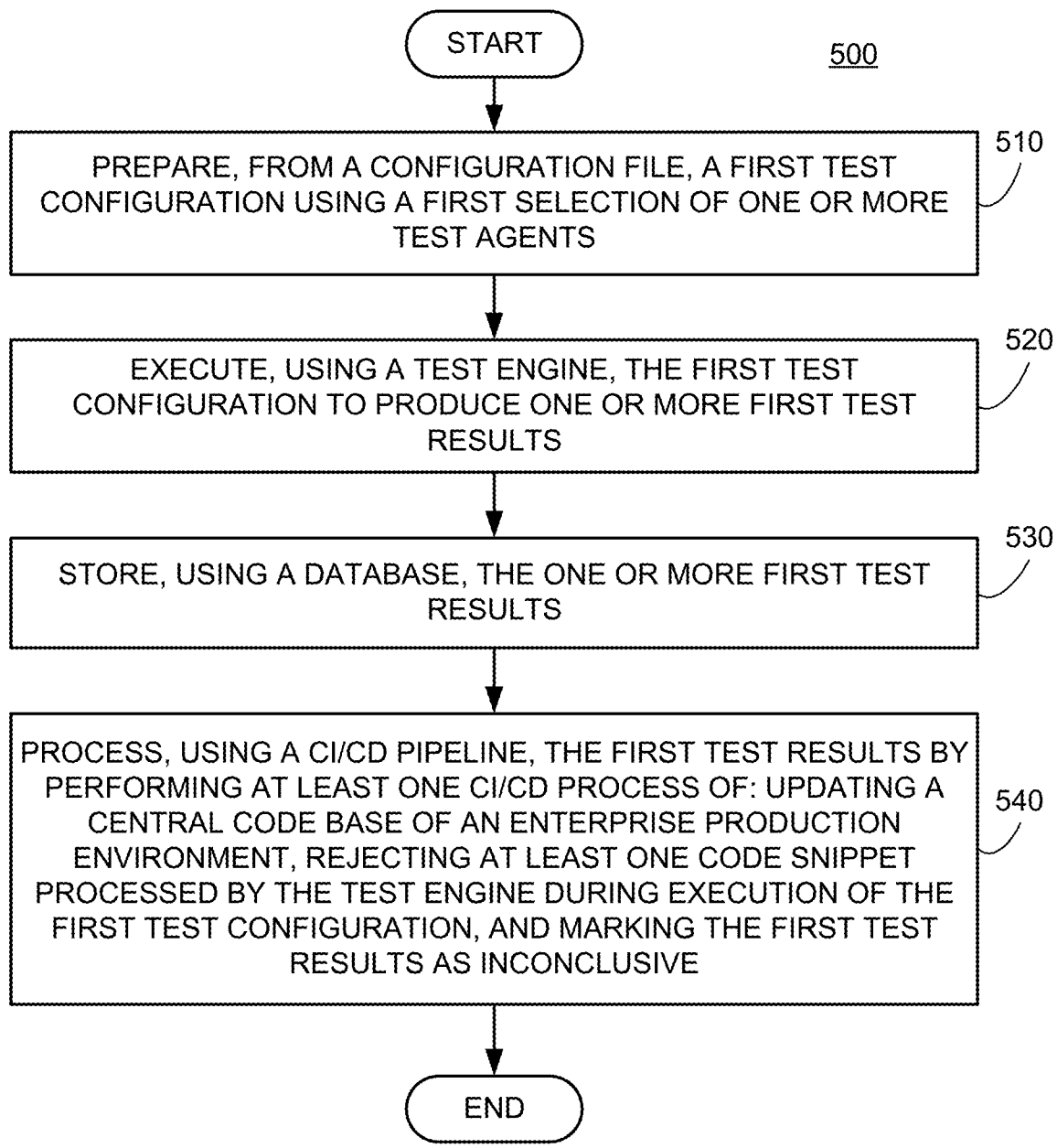
FIG. 5 is a flowchart showing operation of a second example system including an API driven test platform, in accordance with some embodiments.

FIG. 5 shows a flowchart of a method 500 according to an example embodiment. Method 500 may be performed by controller 210 and/or other components of multi-system tool 110 alone or in cooperation with one or more other devices or systems. In block 510, the system (e.g., via multi-system tool 110, and/or web portal 360) may prepare, from a configuration file, a first test configuration using a first selection of one or more test agents 330A. In one embodiment, each test agent 330A has a customized configuration even though there may be common configuration elements across different test agents. Common configurations are, for example: testSetName, testType, testAgentType, resourcePath and testSetDisabled. One configuration, stepDefinitionPath, may be very specific to a cucumber test agent like RestAssured, Karate, or RubyCucumber. Another configuration, testScriptName, may be used in a JMeter test agent testSet configuration, which may be configured to specify an Apache JMeter file (e.g., .jmx file) to be used for executing a performance test. For example, the system may assemble one or more functional test agents 330A (e.g., RestAssured, Karate, RubyCucumber, Postman, Mocha, Protractor, Selenium, Behave, Puppeteer) and/or one or more performance test agents (JMeter, WRK, Hercules). The configuration file may be a JSON Java test file or any formatted file listing all testSets desired to be executed. A testSet may have a unique name and specify a type of test, collection of one or more agents 330A to use, resource locations, and a set of properties.

In block 520, the system (e.g., via multi-system tool 110, production environment 140, and/or virtual resources) may execute, using a test engine 310, the first test configuration to produce one or more first test results. For example, one or more available test engines (e.g., test engine 310) may access a test URL, branch, and configuration from a GitHub repository (e.g., via cloud tools 126, memory 230, storage device 234, memory module 238) in order to complete the test. For example, a repository URL may point to a location of a committed test configuration for access by a test engine, and a branch refers to a specific version of the test when multiple versions are present. In one embodiment a new branch is created whenever a test is modified. In various embodiments, registering a repository URL, branch, and/or test configuration file may include notifying one or more of CI/CD system 130, multi-system tool 110, test platform 120, and/or production environment 140 regarding the whereabouts of the test components (e.g., in storage device 234, memory module 238, cloud tool(s) 126 and/or memory 230) and the readiness of test components for processing and/or execution. In some embodiments, by executing the test in block 520, CI/CD system 130 may use one or more virtual servers, virtual machines, and/or hardware abstraction layers to mimic functions of production environment 140 in order to execute the test configuration (e.g., using API(s) rules) without occupying or otherwise interrupting production environment 140. In one or more embodiments, by executing the test in block 520, operation of a CI/CD pipeline via CI/CD system 130 may directly employ functions of production environment 140 in order to execute the test configuration. For example, CI/CD system 130 may use one or more servers 144, computing devices 142, or other elements of production environment 140 to execute the test configuration (e.g., using API(s) rules).

In one or more embodiments, a collection of testSets may be configured by a user to orchestrate in a sequential or parallel (e.g., default) way. Even in sequential execution, a test execution may not stop (or abort) a sequence when a testSet fails execution. A main intent behind sequential execution may be to allow a user to avoid bombarding the application-under-test with test scenarios from different testSets in a parallel way. In some embodiments, execution of a test configuration in block 520 may be performed in a scalable way, as will be further discussed below. For example, prior to execution of a test configuration, system 100 may be running only an orchestrator (e.g., test engine 310) and a database (e.g., cloud tools 126, memory 230, storage device 234, memory module 238), and execution of a test configuration may cause system 100 to launch and/or deploy one or more test agents 330A in order to process the test configuration. In various embodiments, test agent 330A deployment may be based on free and/or available memory, and test agents 330A may be docker containerized (e.g., dockerized) for scalability (e.g., modularity and/or portability). In some embodiments, the launched test agents 330A may be terminated upon test completion. In this manner, system 100 may offer a dynamically scalable functionality that allows system 100 to spawn and kill test agents 330A at will. In one or more embodiments, a lambda function (e.g., an Amazon Web Services Lambda function) may perform any necessary calculations for spawning and/or killing test agents 330A. Scalability of system 100 will be discussed in more detail below with regards to FIG. 8.

In block 530, the system (e.g., via multi-system tool 110 of system 100) may store, using a database (e.g., storage device 234, memory module 238, cloud tool(s) 126, and/or memory 230), the one or more first test results. For example, the test results may be stored in one or more postgres relational databases. Further, the test results may be stored in full (e.g., upon testing completion) or partial form (e.g., when testing is paused), and the test results may be stored with or without later-performed trend analysis.

In block 540, the system (e.g., via multi-system tool 110 and/or production environment 140) may process, using a CI/CD pipeline, the first test results by performing at least one CI/CD process of: (a) updating a central code and/or application base of an enterprise production environment (e.g., by accepting, recompiling, replacing, side-loading, formatting, and/or re-writing), (b) rejecting at least one code snippet and/or application processed by the test engine during execution of the first test configuration (e.g., by deletion, quarantine, sandboxing, and/or black-holing), or (c) marking the first test results as inconclusive. In one or more embodiments, central code and/or application base may refer to any one or more combinations of various programs, applications, scripts, libraries, program codes and/or executables that allow production environment 140 to operate and carry out any necessary functions as required by its particular setting (e.g., school, corporation, enterprise, government, or other network). In various embodiments, (a) updating a central code and/or application base repository (e.g., github) may be a standard process. The code and/or application base repository may include test configuration files and test resources associated therewith, which may be managed and maintained by developers of an application-under-test (e.g., software or applications that are being developed or optimized for production environment 140). In some embodiments, (b) rejecting at least one code snippet and/or application may be transparent to the test platform, as it may rely on a test framework to provide functionality of how to execute a test scenario (e.g., the test framework may assert the test results to determine if the test scenario has passed or failed). In other embodiments (c) marking the first test results as inconclusive may include providing an indication to a developer or registered user that the test results were inconclusive (e.g., due to a run-time failure, configuration error, hardware malfunction, and/or any other unexpected result).

Figure 6:
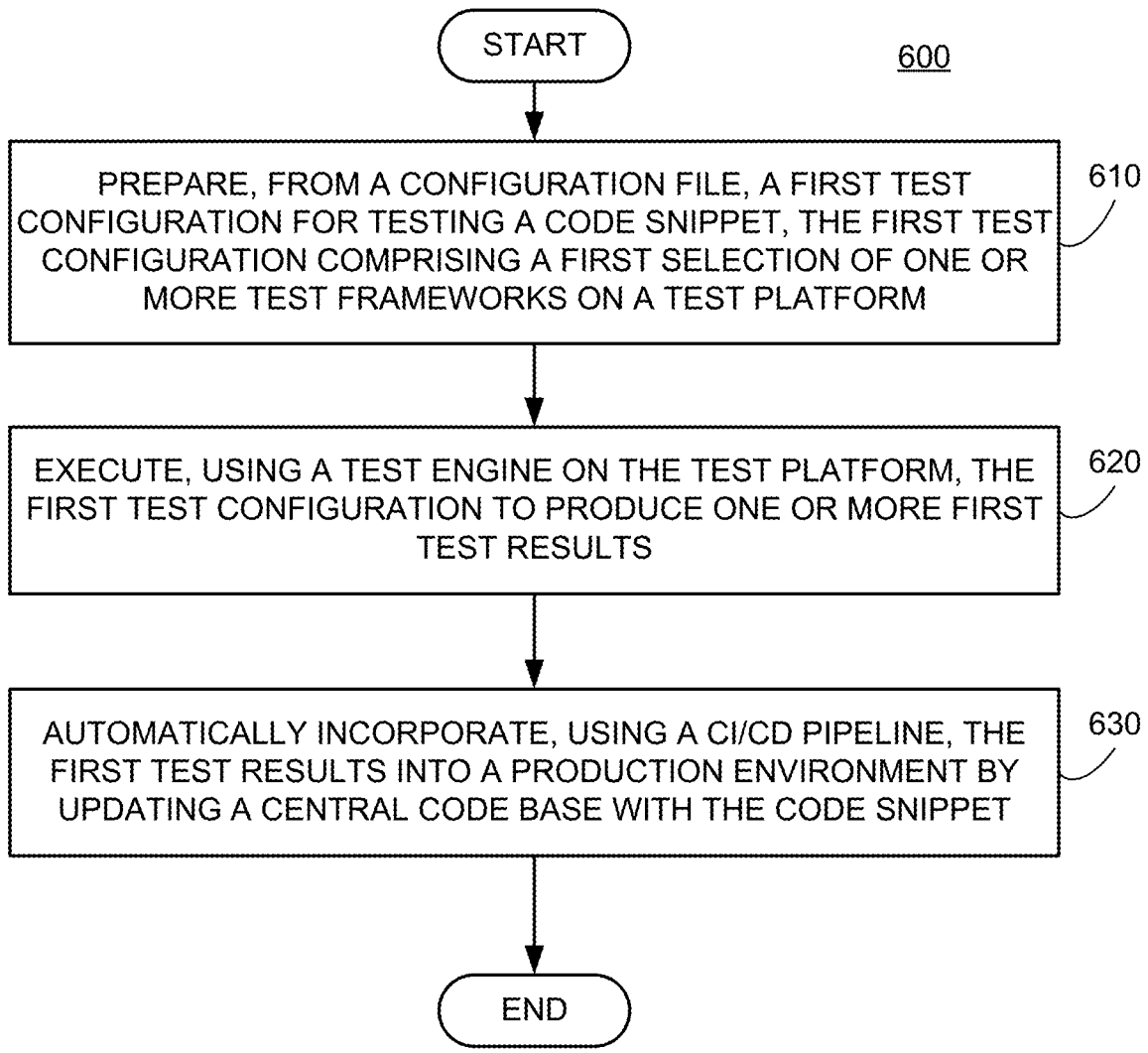
FIG. 6 is a flowchart showing operation of a third example system including a production environment executing a central code base, in accordance with some embodiments.

FIG. 6 shows a flowchart of a method 600 according to an example embodiment. Method 600 may be performed by controller 210 and/or other components of multi-system tool 110 alone or in cooperation with one or more other devices or systems. In block 610, system (e.g., via multi-system tool 110 of system 100) may prepare, from a configuration file, a first test configuration for testing a code snippet and/or application. The first test configuration may include a first selection of one or more test frameworks on a test platform (e.g., test platform 120 and/or production environment 140). For example, the one or more test frameworks may correspond to one or more applications, where the one or more frameworks include: RestAssured, Karate, RubyCucumber, Postman, Mocha, Protractor, Selenium, JMeter, WRK, Hercules, Behave, Puppeteer.

In block 620, the system (e.g., via multi-system tool 110 of system 100) may execute, using a test engine (e.g., test engine 310) on the test platform (e.g., test platform 120 and/or production environment 140), the first test configuration to produce one or more first test results. In one or more embodiments, executing the first test configuration in block 620 may include automated execution of all testSets configured by a user in the configuration file. For example, the test engine 310 may access a repository URL containing the test configuration, and recruit the appropriate test agents (e.g., 330A-N) and frameworks for executing the test. As previously discussed, in various embodiments, a collection of testSets may be configured by a user to orchestrate in a sequential or parallel (e.g., default) way. Even in sequential execution, a test execution may not stop (or abort) a sequence when a testSet fails execution. A main intent behind sequential execution may be to allow a user to avoid bombarding the application-under-test with test scenarios from different testSets in a parallel way. In one or more embodiments, parallel execution may include multithreading instructions within the configuration file and/or test framework(s) in order to optimize execution on multi-processor systems.

In block 630, the system (e.g., via multi-system tool 110 of system 100) may automatically incorporate, using a CI/CD pipeline (e.g., CI/CD pipeline 130), the first test results into a production environment by updating a central code and/or application base with the code snippet and/or application. For example, the system may incorporate the snippet and/or application into the CI/CD pipeline by accepting, recompiling, replacing, side-loading, formatting, or re-writing central code and/or application base. For example, the system may incorporate the snippet and/or application into the CI/CD pipeline by accepting the snippet or application into central code and/or application base when the snippet or application has been successfully run on production environment 140 without errors. For example, the system may incorporate the snippet and/or application into the CI/CD pipeline by recompiling when access is provided to central code and/or application base. Further, the system may incorporate the snippet and/or application into the CI/CD pipeline by replacement when the snippet and/or application comprises more than a threshold portion of central code and/or application base (e.g., 50%, 75%, or more of central code and/or application base). Further, the system may incorporate the snippet and/or application into the CI/CD pipeline by side-loading when there is no access or forbidden access to central code and/or application base, or, when any scenario occurs where central code and/or application base may not be otherwise interrupted (e.g., when central code and/or application base is related to critical functioning environments such as in medical, defense, or other uninterruptable systems). Further, the system may incorporate the snippet and/or application into the CI/CD pipeline by formatting when the snippet and/or application and central code and/or application base operate on disparate architectures and formatting of the snippet and/or application is required to arrive at a set of instructions that are compatible with central code and/or application base (e.g., formatting between 32-bit and 64-bit architectures).

Further, the system may incorporate the snippet and/or application into the CI/CD pipeline by re-writing when compiling the snippet and/or application with central code and/or application base would result in fewer lines of code when they are re-written together in a single binary. Regardless of how the system incorporates the snippet and/or application into the CI/CD pipeline via the central code and/or application base, the step of incorporating the test results automatically may instantiate one or more automatic-incorporation procedures. For example, in a recursive execution whereby the system is processing a test configuration in order to satisfy a desired set of one or more functional and/or performance results, the automatic-incorporation procedure may trigger once a functional and/or performance result target is hit, at which point the above-mentioned accepting, recompiling, replacing, side-loading, formatting, or re-writing action is taken. In some embodiments, for example in a test-only and/or sandbox mode, the automatic-incorporation procedure may trigger once a set of desired result traits are hit, at which point the results are displayed to a requestor(s) of the test for review, or, the above-mentioned accepting, recompiling, replacing, side-loading, formatting, or re-writing action may be taken in a virtual non-production environment in order to not impact production environment 140. Various automatic-incorporation procedures may be contemplated without departing from the spirit and scope of the disclosure.

Figure 7:
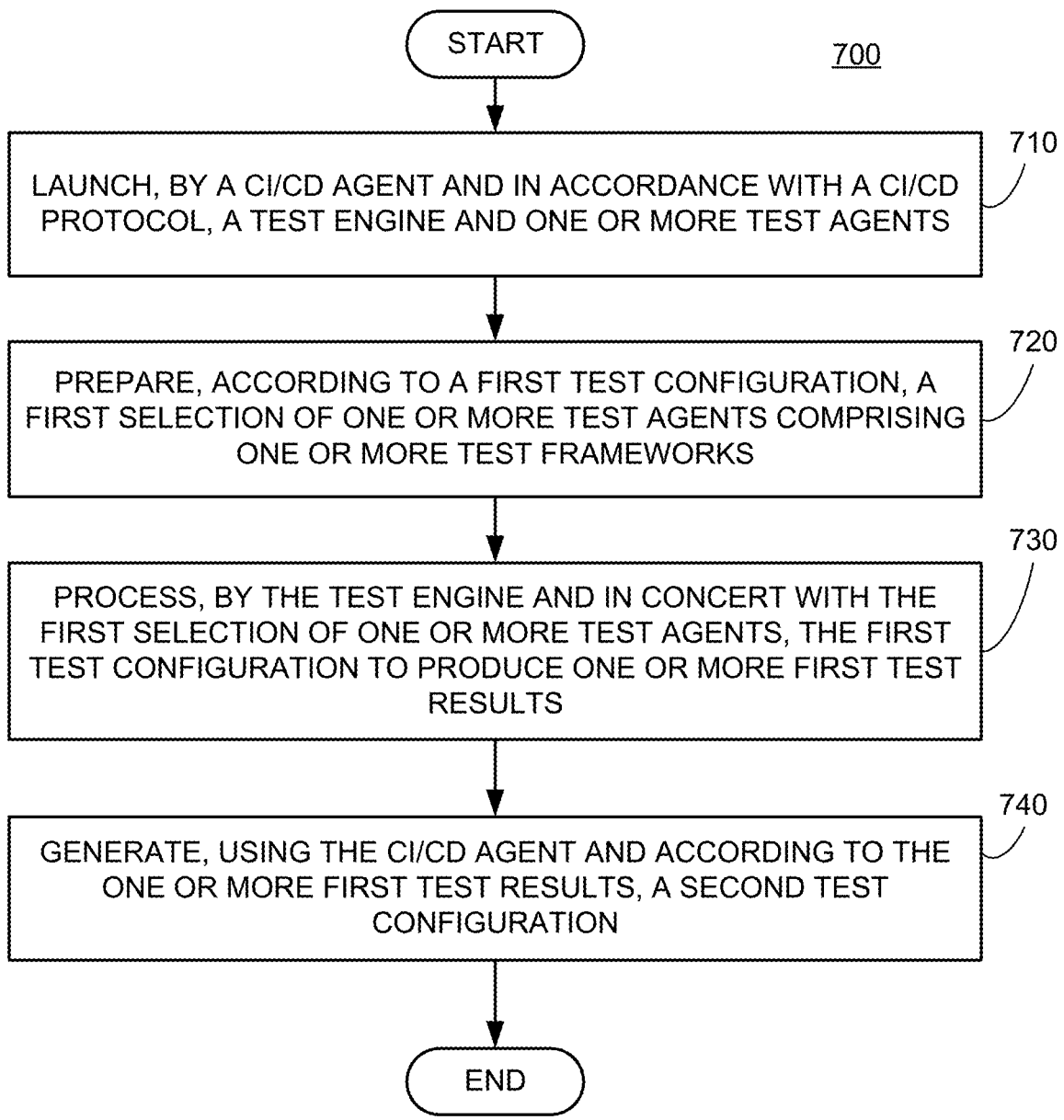
FIG. 7 is a flowchart showing operation of a fourth example system including a continuous integration and continuous delivery (CI/CD) agent, in accordance with some embodiments.

FIG. 7 shows a flowchart of a method 700 according to an example embodiment. Method 700 may be performed by controller 210 and/or other components of multi-system tool 110 alone or in cooperation with one or more other devices or systems. In block 710, the system (e.g., via multi-system tool 110 of system 100) may launch, by a CI/CD system (e.g., CI/CD system 130) and in accordance with a CI/CD protocol, a test engine 310 and one or more test agents 330A. In some embodiments, the system may assemble one or more functional test agents (e.g., RestAssured, Karate, RubyCucumber, Postman, Mocha, Protractor, Selenium, Behave, Puppeteer) and/or one or more performance test agents (e.g., JMeter, WRK, Hercules). For example, an enterprise network without CI/CD, may download a CI/CD protocol from a CI/CD system (e.g., CI/CD system 130), or remotely execute the protocol on the CI/CD system. The CI/CD protocol may include COVE, Jenkins, RevUP, Bogie, Hyperloop.

In block 720, the system (e.g., via multi-system tool 110 of system 100) may prepare, according to a first test configuration, a first selection of one or more test agents 330A including one or more test frameworks. For example, the one or more test frameworks may correspond to one or more applications, where the one or more frameworks include: RestAssured, Karate, RubyCucumber, Postman, Mocha, Protractor, Selenium, JMeter, WRK, Hercules, Behave, Puppeteer. In various embodiments, the test frameworks may perform functional and/or performance tests on a particular type of application. For example, JMeter may be summoned for applications that contain Apache code language and/or for any application that include web-based load testing. Further, WRK may be summoned for applications that contain HTTP code language and/or for any application that include web-based high-load services. Further, Selenium may be summoned for applications that contain various code languages (e.g., C#, Groovy, Java, Perl, PHP, Python, Ruby and Scala) and/or for any application that includes automations services.

In block 730, the system (e.g., via multi-system tool 110 of system 100) may process, by the test engine (e.g., test engine 310) and in concert with the first selection of one or more test agents, the first test configuration to produce one or more first test results. For example, the test engine may access a repository URL containing the test configuration and recruit the appropriate test agents and frameworks for executing the test. In some embodiments by processing the test in block 730, CI/CD system 130 may use one or more virtual servers, virtual machines, and/or hardware abstraction layers to mimic functions of production environment 140 in order to execute the test configuration without occupying or otherwise interrupting production environment 140, in order to produce the first test results. In one or more embodiments by processing the test in block 730, operation of a CI/CD pipeline via CI/CD system 130 may directly employ functions of production environment 140 in order to execute the test configuration. For example, CI/CD system 130 may use one or more servers 144, computing devices 142, or other elements of production environment 140 to execute the test configuration and produce the first test results.

In block 740, the system (e.g., via multi-system tool 110 of system 100) may generate, using the CI/CD system (e.g., CI/CD system 130) and according to the one or more first test results, a second test configuration. For example, the CI/CD system may generate a new, second test configuration with corresponding JSON file, submit it to the Test engine, and produce a second result that is further refined from the first result. For example, in a recursive execution whereby the system is processing a test configuration in order to satisfy a desired set of one or more functional and/or performance results, generation of a second test configuration may trigger once a functional and/or performance result target is hit, at which point an above-mentioned accepting, recompiling, replacing, side-loading, formatting, or re-writing action may be taken on a central code and/or application base of production environment 140. Further, the second test configuration may specify an entirely different set of desired functional and/or performance results that may be dependent upon successful execution and completion of a first set of functional and/or performance results. For example, an initial test configuration may specify a stratified set of goals that are required to be hit, in order, as a recursive execution meets a first goal, incorporates the result, and then advances to a subsequent goal. In one embodiment, a first goal may be a functional goal (e.g., execute a given test configuration without failure), and a second or subsequent goal may be a performance goal (e.g., execute a given test configuration until a threshold performance level is met).

Figure 8:
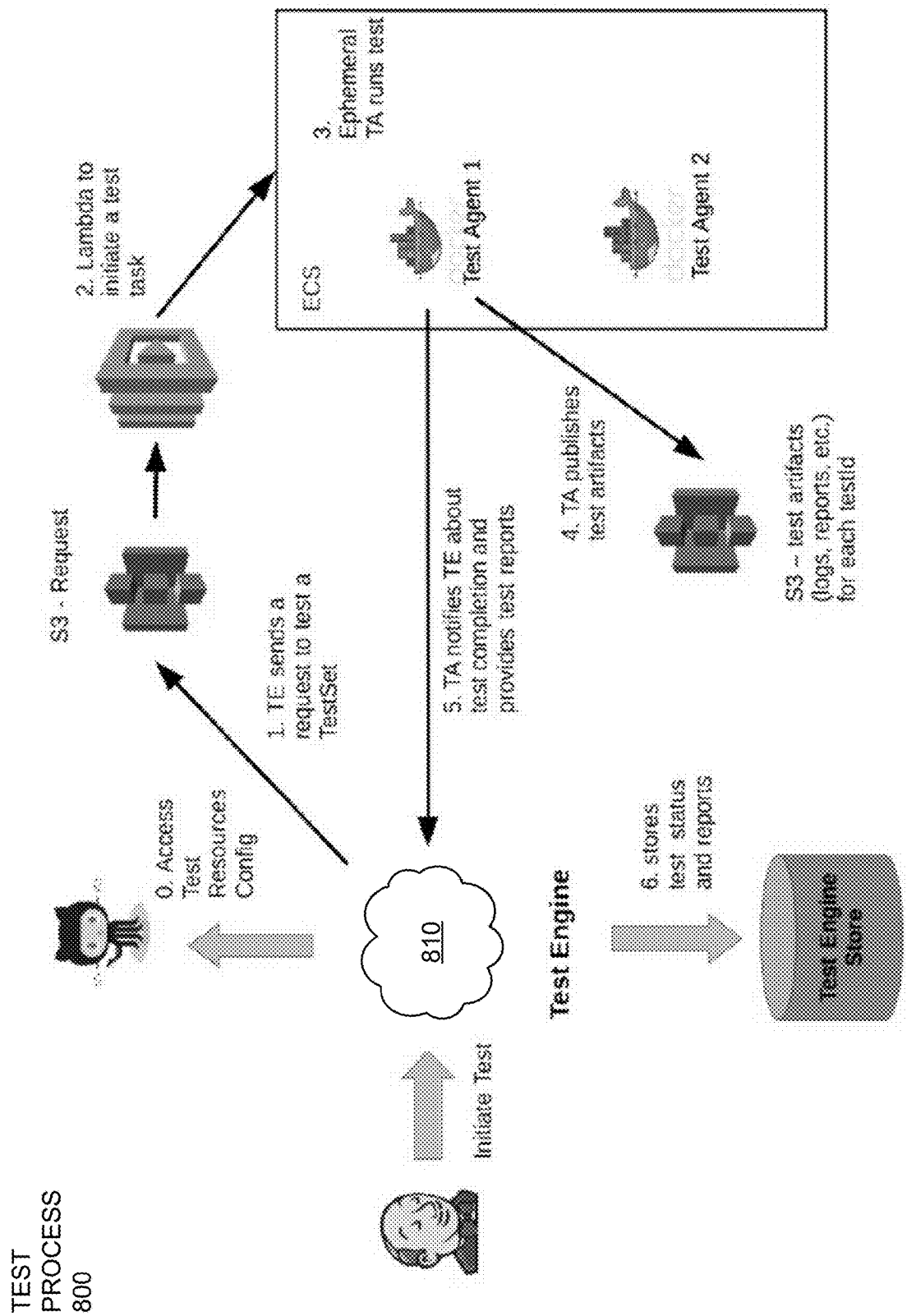
FIG. 8 is a representation of an example test process, in accordance with some embodiments.

FIG. 8 shows an exemplary test process 800 according to one or more embodiments. Test process 800 may include a general message flow without specific association to one or more components of the system. It will be appreciated that various components may be associated with the message flow without departing from the spirit and scope of the disclosure. In one or more embodiments, test process 800 may include, at step 0, accessing a test resource configuration. Further, at step 1, one or more test engines send a request to a TestSet, and at step 2, the system initiates a test task. In one or more embodiments, initiating the test task at step 2 may involve a scalability aspect. For example, prior to execution of a test configuration, the process 800 may be running only an orchestrator (e.g., test engine 310) and a database (e.g., cloud tools 126, memory 230, storage device 234, memory module 238), and execution of a test configuration may cause the process 800 to launch and/or deploy one or more test agents 330A in order to process the test configuration. In various embodiments, test agent 330A deployment may be based on free and/or available memory, and test agents 330A may be docker containerized (e.g., dockerized) for scalability (e.g., modularity and/or portability). In some embodiments, any launched test agents 330A may be terminated upon test completion. In this manner, process 800 may offer a dynamically scalable functionality that allows process 800 to spawn and kill test agents 330A at will. In one or more embodiments, a lambda function (e.g., an Amazon Web Services Lambda function) may perform any necessary calculations for spawning and/or killing test agents 330A. At step 3, the one or more test agents run the test, and at step 4, they publish test artifacts. At step 5, the test agents notify the test engine of test completion and at step 6, the database (e.g., cloud tools 126, memory 230, storage device 234, memory module 238) stores the test status and test reports. Additionally, though not shown, test process 800 may further include trend analysis or investigation of the test results.

Figure 9:
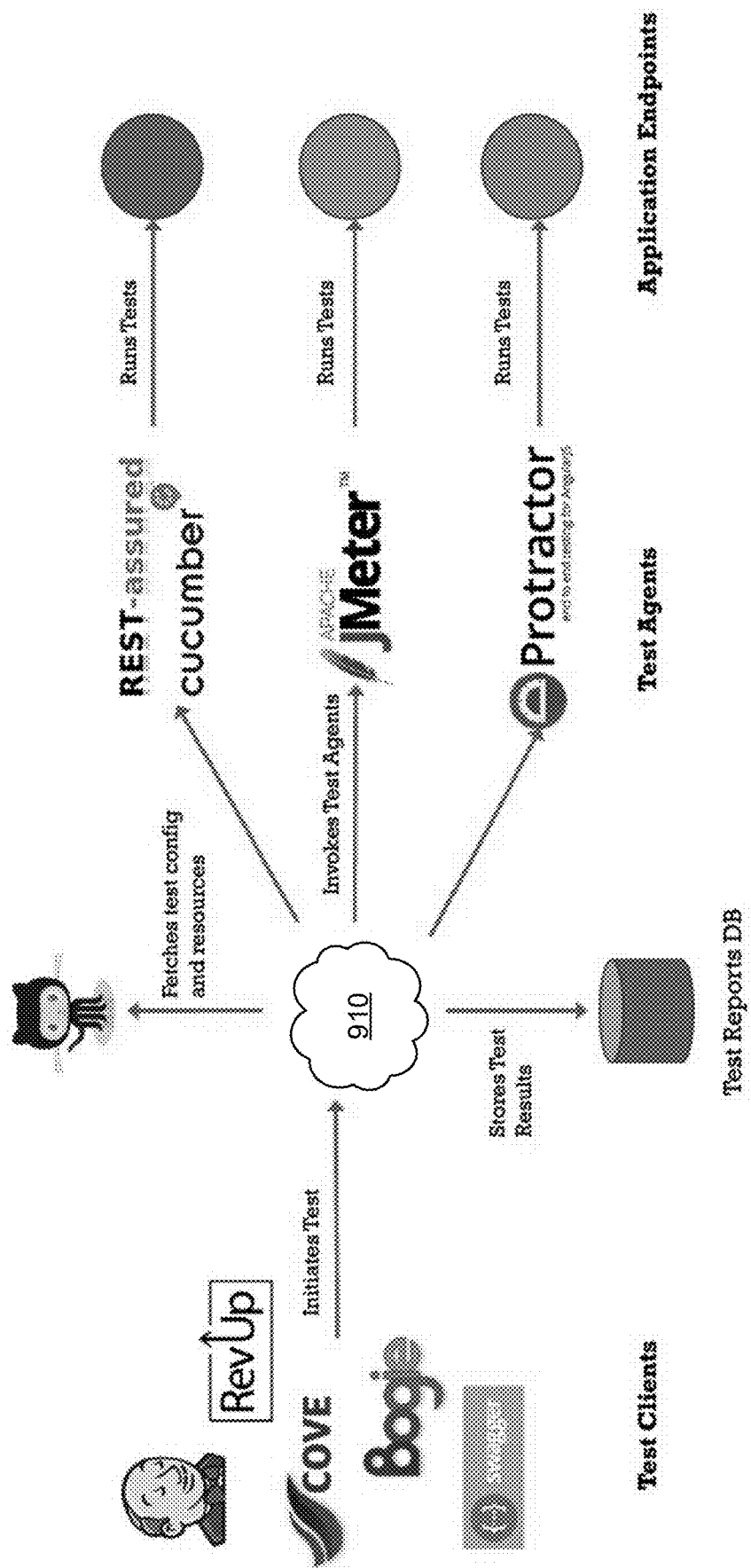
FIG. 9 is a representation of an example test abstraction, in accordance with some embodiments.

FIG. 9 shows an exemplary test abstraction 900 of test platform 910 according to one or more embodiments. For example, in test abstraction 900 specific components are not associated with specific procedures, and it will be appreciated that various elements may carry out the procedures without departing from the spirit and scope of the disclosure. In one or more embodiments, test abstraction 900 may provide a high-level overview of an API driven test platform, including test initiation, test configuration, and resource fetching and test agent invocation. Further, test abstraction 900 may include storage of test results in test report database.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described herein with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described herein with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Exemplary Use Case

The following exemplary use case describe an example of a typical system flow pattern. They are intended solely for explanatory purposes and not in limitation. Initially, the system (e.g., system 100) may start with a user preparing a test configuration file in a CI/CD network. For example, a user and/or administrator may submit a test configuration for execution by test platform 120 and/or test platform 300. The user and/or administrator may submit the test configuration directly or via CI/CD system 130. Further, the test configuration may include one or more performance and/or functional goals (e.g., performance thresholds and/or functional thresholds). In some embodiments, CI/CD system 130 may submit a test configuration automatically based on recursive execution of a previously-submitted test configuration that specified detailed requirements for performance and/or functional results. The test configuration file may include a JSON Java file with various test parameters, test agents (e.g., test agent(s) 330A-N), and a test URL pointing to a repository (e.g., cloud tool(s) 126, and/or memory 230). The system may commit the test configuration and resources to the repository for access by a test engine (e.g., test engine 310). For example, the test configuration may be committed to a GitHub repository, which is later accessed by the one or more test engines. Using a web portal, one or more administrators or users may create or log into a test account, which becomes associated with the test configuration for execution and report access. Using an API, such as Swagger UI, the system may invoke the test and check the status of the test. Execution of the test may entail parsing disparate application test results using one or more frameworks, such as, for example, RestAssured, Karate, RubyCucumber, Postman, Mocha, Protractor, Selenium, JMeter, WRK, Hercules, Behave, Puppeteer. Upon completion of the test, the results may be stored in one or more relational databases, such as a postgres database or an Amazon Web Services (AWS) database. The parsed test results may be stored in a uniform format on the database, or the results may become uniform or homogenized when they are later accessed. Further, the test results may be stored in full (e.g., upon testing completion) or partial form (e.g., when testing is paused), and the test results may be stored with or without later-performed trend analysis. The system may either use the later accessed test results for trend analysis or re-insert them into the CI/CD system for further processing and development of additional or secondary test configuration. Such a recursive test process may be done as many times as necessary to optimize the system. For example, recursive testing may be executed until the system reaches a pre-determined threshold result for performance and/or functional results. In one or more embodiments, an application-under-test may be regarded as performing optimally when system performance metrics are within boundaries of a defined SLA (e.g., service level agreement). Various SLA aspects may be: throughPut, responseTime and errorPercent, although other aspects may be considered without departing from the spirit and scope of the disclosure. The relational database may be further accessed to provide trend analysis of the test results. For example, trend analysis may provide reports on functional and/or performance results. In various embodiments, trend analysis may be performed externally by pulling all test reports from past test executions and comparing them one by one automatically or manually.

Exemplary Formats

An exemplary format for processed (e.g., standard, uniform, or homogenous) functional test results may be as follows:

```
{
    "testId: "b9a6da5e-f698-4f71-bb90-3187df122fa3",
    "status": "COMPLETED",
    "testSetName": "protractortest",
    "testType": "functional",
    "testAgentType": "protractor",
    "componentName": "DemoUserService",
```

-continued

```
"ASV": "ASVCHASSISDEVELOPMENTTOOLS",
"BAP": "BAPPRCHASSIS",
"testRequestId": "db502927-ec30-4884-918e-d89f105a9e9f",
"tags": [ ],
"testRunStatus": "PASS",
"testCasesCount": 2,
"testCasesPassedCount": 2,
"testCasesFailedCount": 0,
"testCasesSkippedCount": 0,
"testCases": [
   {
      "testCaseId": "Protractor Demo to check the page title",
      "status": "PASS"
   },
   {
      "testCaseId": "Protractor Demo to check the page title",
      "status": "PASS"
   }
   ]
}
```

An exemplary format for processed (e.g., standard, uniform, or homogenous) performance test results may be as follows:

```
{
"testId": "7a3aa54d-10fb-445a-bf96-39e8c4908da1",
"status": "COMPLETED",
"testSetName": "getUser_PTJmeterUpgrade",
"testType": "performance",
"testAgentType": "jmeter_pt",
"componentName": "DemoUserService",
"ASV": "ASVCHASSISDEVELOPMENTTOOLS",
"BAP": "BAPPRCHASSIS",
"testRequestId": "d2e9f5b9-d1fa-44dd-bc31-b640c1093473",
"tags": [ ],
"performanceMetrics": {
    "tags": [ ],
    "endTime": "2019-02-27T22:10:59Z",
    "message": "Standardized report for testSet,
    getUser_PTJmeterUpgrade"
    "startTime": "2019-02-27T22:08:17Z",
    "testSetName": "getUser_PTJmeterUpgrade",
    "testDuration": "3m",
    "actualResults": {
        "throughPut": 2.32,
        "errorPercent": 0,
        "responseTime": 4,
        "maxResponseTime": 81,
        "minResponseTime": 2
    },
    "benchmarkUsed": {
        "throughPut": 2,
        "errorPercent": 1,
        "responseTime": 12,
        "maxResponseTime": 200,
        "minResponseTime": 8
    },
    "testRunStatus": "PASS"
  }
}
```

What is claimed is:

1. A method for providing continuous test platforms, the method comprising:
responsive to receiving a test configuration from a first user, preparing a first test configuration file comprising a first set of test agents;
committing the first test configuration file to a repository to be accessed by one or more test engines, the repository comprising a second test configuration file comprising a second set of test agents;
registering, in a continuous integration and continuous delivery (CI/CD) system, a uniform resource locator (URL) of the repository, a current branch of the repository, the first test configuration file, and the second test configuration file;
executing, by the CI/CD system, a test on an application using one or more application programming interfaces (APIs) corresponding to the application and one or more test agents selected from the first set of test agents and the second set of test agents, wherein the one or more test agents selected by a dockerizing module and based on a level of demand on each test engine of the one or more test engines;
receiving a first test result received from the execution of the first test configuration file by the first set of test agents;
receiving a second test result from the execution of the second test configuration file by the second set of test agents; and
providing a status of the test on the application to a user interface (UI), the status comprising the first test result and the second test result.

2. The method of claim 1, further comprising registering the first user as a registered user with the CI/CD system thereby associating a test account of the registered user with the first test configuration file.

3. The method of claim 1, wherein the second test configuration file is associated with a test account of a second user.

4. The method of claim 1, further comprising homogenizing, in the CI/CD system, the first test result and the second test result as a uniform result having a uniform result format.

5. The method of claim 4, further comprising processing, using the CI/CD system, the uniform result by performing at least one CI/CD process selected based on the uniform result, wherein the at least one CI/CD process comprises at least one of:
updating a central code base of an enterprise production environment, rejecting at least one code snippet processed by the test engine during execution of the first test configuration or the second test configuration, or marking the first test results as inconclusive.

6. The method of claim 1, wherein the first set of test agents and the second set of test agents comprise one or more test frameworks of: Karate, Protractor, RestAssured, RubyCucumber, and Apache JMeter.

7. The method of claim 6, wherein the one or more test frameworks comprise modular test frameworks that each correspond to one or more applications; and the one or more applications are configured to output one or more results that are dissimilar to the first test result and the second test result.

8. The method of claim 7, further comprising: adding a first modular test framework in response to a change in the one or more applications; and removing a second modular test framework in response to the change in the one or more applications.

9. A method for providing continuous test platforms, comprising:
receiving a test configuration request from a first user, the test configuration request comprising one or more desired testSets to be executed;
preparing, according to the test configuration request, a first test configuration comprising a first selection of one or more test agents, the first test configuration associated with a first application having a first set of application programming interface (API) rules;
executing, using a test engine, the first test configuration to produce one or more first test results;
storing, in a database, the one or more first test results;

preparing, according to the test configuration request, a second test configuration comprising a second selection of the one or more test agents, the second test configuration being separate from the first test configuration and being associated with a second application having a second set of API rules;

committing the first test configuration and the second test configuration to a repository, the first test configuration and the second test configuration being registered to the first user in the repository;

executing, using the test engine, the second test configuration to produce one or more second test results;

storing, in the database, the one or more second test results; and homogenizing, in the database, the one or more first test results and the one or more second test results as one or more uniform results in a uniform results format.

10. The method of claim 9, wherein the first selection of the one or more test agents is controlled by a dockerizing module and based on a level of demand on the test engine.

11. The method of claim 9, wherein the second selection of the one or more test agents is controlled by a dockerizing module and based on a level of demand on the test engine.

12. The method of claim 9, further comprising: processing, using a continuous integration and continuous delivery (CI/CD) pipeline, the one or more uniform results by performing at least one CI/CD process selected based on the one or more uniform results.

13. The method of claim 12, wherein the at least one CI/CD process comprises at least one of: updating a central code base of an enterprise production environment, rejecting at least one code snippet processed by the test engine during execution of the first test configuration or the second test configuration, or marking the first test results as inconclusive.

14. The method of claim 9, wherein the one or more test agents comprise one or more test frameworks of: Karate, Protractor, RestAssured, RubyCucumber, and Apache JMeter.

15. A method, comprising:
receiving a test configuration request from a first user, the test configuration request comprising one or more desired testSets to be executed;

launching, with a continuous integration and continuous delivery (CI/CD) agent in accordance with a CI/CD protocol, a test engine and one or more test agents corresponding to the test configuration request, each of the one or more test agents comprising an application programming interface (API);

preparing, according to a first test configuration, a first selection of the one or more test agents comprising one or more test frameworks, the first selection of the one or more test agents comprising a first set of API rules;

preparing, according to a second test configuration, a second selection of the one or more test agents comprising the one or more test frameworks, the second selection of the one or more test agents comprising a second set of API rules;

committing first test configuration and the second test configuration to a repository, the first test configuration and the second test configuration being registered to the first user in the repository;

processing, with the test engine, the first test configuration with the first selection to produce one or more first test results; and processing, with the test engine, the second test configuration with the second selection to produce one or more second test results.

16. The method of claim 15, further comprising: homogenizing the one or more first test results and the one or more second test results in a uniform results format; and generating, using the CI/CD agent and according to the uniform results format, a third test configuration.

17. The method of claim 15, wherein the one or more test agents comprise modular test agents that each correspond to one or more applications; and the one or more applications are configured to output one or more results that are dissimilar to the one or more first test results and the one or more second test results.

18. The method of claim 15, further comprising controlling, with a dockerizing module, an allocation of the one or more test agents based on a level of demand on the test engine.

19. The method of claim 16, further comprising performing a trend analysis using the uniform results format.

* * * * *